United States Patent [19]
Farrington et al.

[11] 3,903,025
[45] Sept. 2, 1975

[54] METHOD FOR COLD MOLDING PITCH BONDED REFRACTORY

[75] Inventors: Grant M. Farrington, Marlton, N.J.; J. Donald Harris, Beamsville, Canada; Alfred H. Foessel, Baltimore, Md.

[73] Assignee: General Refractories Company, Bala Cynwyd, Pa.

[22] Filed: Nov. 6, 1973

[21] Appl. No.: 413,250

[52] U.S. Cl. ............ 260/17.5; 106/38.25; 106/38.8; 260/19 N; 260/28; 264/29
[51] Int. Cl.² ........................................ C08L 95/00
[58] Field of Search ................... 260/17.5, 19 N, 28; 106/38.8, 38.25

[56] References Cited
UNITED STATES PATENTS

| | | | |
|---|---|---|---|
| 851,381 | 4/1907 | Robeson | 106/38.8 X |
| 2,668,774 | 2/1954 | Meyl | 106/38.25 |
| 2,988,525 | 6/1961 | Clem | 260/25 |
| 3,037,873 | 6/1962 | Ingala | 106/38.23 |
| 3,112,206 | 11/1963 | Mocsny | 106/38.5 |
| 3,115,414 | 12/1963 | Lottridge et al. | 106/38.23 |
| 3,189,566 | 6/1965 | Shinjo | 260/17.5 |
| 3,385,345 | 5/1968 | Miraldi | 164/43 |

OTHER PUBLICATIONS
"Refractory Materials", Tokyo Ceramic Industries, Ltd., Chem. Abstracts, 67, 119921z, (1967).

Primary Examiner—Howard E. Schain
Assistant Examiner—E. A. Nielsen
Attorney, Agent, or Firm—Everett H. Murray, Jr.; Brian G. Brunsvold; Herbert H. Mintz

[57] ABSTRACT

A binder composition comprising pitch, an aqueous solution of a water soluble resin, and an organic solvent solution of a thermosetting polymer. The binding composition in combination with particulate refractory aggregate forms a molding composition suitable for use in making shaped refractory articles. Shaped refractory articles prepared from such a molding composition are particularly suitable for use as linings in basic oxygen process steel refining vessels. Shaped refractory articles may be prepared by coating coarse refractory aggregate with the organic solvent solution of a thermosetting polymer, admixing powdered pitch with the coated coarse refractory aggregate, blending fine refractory aggregate and the aqueous solution of the water soluble resin with the coated refractory aggregate-pitch mixture, and forming the resultant composition into shaped refractory articles.

8 Claims, No Drawings

METHOD FOR COLD MOLDING PITCH BONDED REFRACTORY

FIELD OF THE INVENTION

The present invention pertains to a binder composition useful for bonding refractory particles. The present invention also pertains to a refractory composition useful for making shaped refractory articles. The present invention further pertains to shaped refractory articles and to a method of preparing shaped refractory articles. More particularly, the compositions and process of the present invention provide a method for bonding refractory aggregates into shaped articles at a low temperature. The resultant shaped articles may be used in lining vessels used in basic oxygen steel refining processes.

BACKGROUND OF THE INVENTION

Refractory linings employed in basic oxygen process steel making furnaces must have sufficient strength to support the charge of molten metal in the vessel. In addition, the lining must be resistant to erosion or abrasion caused by the molten metal and molten slag. The porosity of the coked refractory composition is important with respect to the useful life of the lining in the vessel; low porosity refractory linings are relatively impervious and thus the molten metal or molten slag do not readily penetrate the surface of the lining and erode the refractory.

In order to withstand the slagging conditions found in present day basic oxygen steel furnaces, refractory linings must have a porosity after coking of less than 15% and preferably less than 13% (as determined by ASTM procedure C–607). It is also essential that the refractory shapes used for such linings remain strong from room temperature up to a temperature at which the carbonaceous bonding material begins to coke (approximately 850–950F). If a weakness occurs at a temperature below the temperature at which the coke bond begins to form, a soft zone will be created in the lining, resulting in spalling during initial heat-up of the vessel. After coking, the refractory shapes to be useful in basic oxygen furnaces, must have a transverse strength of at least 500 psi.

The conventional method of producing shaped refractory articles for use as linings in basic oxygen blowing steel making vessels involves hot forming of pitch bonded refractory bricks. In this hot forming process, both the pitch and the refractory aggregate are heated to a temperature at which the pitch becomes liquid. The aggregate and the liquid pitch are thoroughly mixed and, at an elevated temperature, fed into a mold and pressed to the desired shape. The formed shape may be either cooled in the mold or further heated to remove the lighter hydrocarbon distillates.

The hot forming process has many disadvantages. All of the process steps must be carried out at an elevated temperature in order to maintain the pitch in a fluid or liquid state. The handling and processing of the hot sticky mixture requires special equipment which is both expensive and costly to operate.

The hot forming process also results in the volatilization of coal tar distillates. These distillates are toxic to operators. Recent listings of threshold limit values of toxic materials by the American Conference of Governmental Industrial Hygienist include coal tar pitch volatiles as human carcinogens and limit exposure too 200 parts per billion.

As is apparent, there is a need for a technique of obtaining bonded refractory aggregates useful in basic oxygen process steel making vessels which avoids the numerous shortcomings of the conventional hot pitch forming process. A technique is particularly needed which does not create hazardous working conditions during processing caused by the volatilization of coal tar distillates.

Several methods have been suggested for manufacturing pitch bonded and pitch containing bricks at room temperature to avoid the high capital expenditures and other disadvantages inherent in the hot pitch bonding process. For example, British Pat. No. 690,859 discloses preparing a ramming mix or brick from a refractory aggregate and a high melting powdered pitch, which involves adding a lubricating liquid to the refractory aggregate-powdered pitch admixture. The lubricant makes the surfaces of the pitch particles oleaginous thereby permitting consolidation of the mixture at room temperatures. The addition of the disclosed liquid hydrocarbon lubricants (kerosene, benzene, or creosote) is indicated to increase the density of the product.

U.S. Pat. No. 3,285,760 to Hildinger et al also discloses a ramming composition of refractory aggregates and powdered pitch. Hildinger suggests the use of anthracene oil or heavy oil as a solvent or lubricant for the powdered pitch. Hildinger indicates, by the use of the solvent, the storage properties of the admixture are improved and that good rammed densities are obtained.

U.S. Pat. No. 3,415,667 to Cummings discloses a technique for preparing pitch bonded refractory compositions in which a liquid hydrocarbon solvent is used to liquefy the pitch. The liquefied pitch is admixed with and encapsulates coarse aggregates. Subsequently, fine aggregates are combined with the pitch encapsulated coarse aggregates and the mixture is pressed into refractory shapes. The refractory shapes are heated to remove the solvent and to solidify the pitch into a strong pitch bond. The liquid hydrocarbon solvent employed by Cummings to dissolve or liquefy the pitch is preferably a trichlorinated hydrocarbon such as trichloroethylene or trichlorobenzene. These solvents are selected because they have a boiling point between 80C. and 200C. which facilitates their removal during heating.

None of the low temperature processes produced above is proven to be entirely satisfactory. For example, none of these methods produces a brick having a coked porosity of under 15%. Also, the suggested solvents and lubricants contain toxic volatiles and therefore do not solve the problem of hazardous conditions during manufacture and use. Other suggested methods of producing, at room temperature, pitch containing brick utilize furfural, furfuryl alcohol, furan resins, or combinations thereof. For example, U.S. Pat. No. 3,496,256 to Boquist describes refractory articles made at room temperature using a pre-polymerized furfuryl alcohol in combination with powdered pitch and a catalyst. Similarly, British Pat. No. 1,268,997 discloses a binder for refractories comprising pitch and a monomeric polymerizable thermosetting admixture including furfural and phenol, cyclohexanone, or a methyl aliphatic ketone.

Although such techniques permit the manufacture at room temperature of refractory bricks having reasonably good properties, these techniques still have some rather substantial drawbacks. For example, furfural is highly toxic and furfuryl alcohol is moderately toxic. In addition, both have threshold limit values of 5 parts per million. The binder of the British patent has an extremely strong odor which is very objectionable to operators. In addition, it has been found that when using the bonding system of this patent, extreme cracking occurs, leading to a very high production loss, if the bricks are placed through a normal refractory brick drier operating at about 300F. In addition, the bricks have very low strength at temperatures of about 300F. which can result in a substantial portion of the bricks spalling off during the initial heating of a basic oxygen converter lining. The spalling can be obviated by drying very slowly at higher temperatures but such a drying process requires special equipment necessitating added operating costs and additional capital expenditures. In addition, the bonding system is very expensive.

As is apparent, there is a need for a technique for producing pitch bonded refractory shapes which can be molded at room temperatures. A desirable technique should produce good quality brick, while eliminating hazardous fumes and pungent odors irritating or injurious to operators.

It has been found, in accordance with the present invention, that refractory aggregates, bonded with a combination of a 150C melting point coal tar powdered pitch, an aqueous solution of a water soluble binder, and an organic solvent solution of a thermosetting resin permits the formation of refractory shapes which have good density, and excellent strength as pressed, after drying, and during and after coking. The aggregate-binder mixture can be dried without bloating or cracking and refractory shapes may be produced which have a porosity after coking of less than 15%. Refractory shapes bonded with such a binder system maintain their high strength through all temperature ranges up to the operating temperature of basic oxygen process steel furnaces. The bonding system may be used with conventional refractory processing equipment, thereby eliminating high capital expenditures. Refractory shapes can be molded at room temperature, without the evolution of hazardous and objectionable odors. The combination of aqueous solution of a water soluble binder and an organic solvent solution of a thermoplastic polymer results in refractory articles having strengths after coking considerably in excess of what would be predicted. The strength of refractory articles bonded with such a system is generally more than double than that obtained when either material is used alone.

SUMMARY OF THE INVENTION

In its broadest aspect, the present invention pertains to a binder composition for binding refractory particles comprising:
 a. 10 to 40% by weight pitch,
 b. 25 to 80% by weight of an aqueous solution of a water soluble resin, which solution contains from 40 to 60% by weight of the water soluble resin, and
 c. 10 to 35% by weight of an organic solvent solution of a thermosetting polymer, which solution contains from 60 to 100% by weight of the thermosetting polymer.

A refractory molding composition useful for making shaped refractory articles can be obtained by blending from 3.0 to 8.0% by weight of this binder composition with particulate refractory material. The refractory molding material may be readily formed into shaped refractory articles at normal room temperatures.

In accordance with a preferred embodiment of the present invention, shaped refractory articles useful for lining basic oxygen process steel making vessels may be prepared by coating 60 to 80 parts by weight of a coarse refractory aggregate having a particle size between 4 mesh and 28 mesh Tyler standard screen with 0.5 to 1.0 parts by weight of an organic solvent solution of a thermosetting polymer containing 60% to 100% by weight of the thermosetting polymer, to obtain a coated coarse refractory aggregate. 1.0 to 2.0 parts by weight powdered pitch are mixed with the polymer-solution-coated coarse refractory aggregate to obtain a coated refractory aggregate-pitch admixture. This admixture is blended with 20 to 40 parts by weight of fine refractory aggregate having a particle size of less than 48 mesh Tyler standard screen and 2.0 to 3.0 parts by weight of an aqueous solution of a water soluble resin containing 40 to 60% by weight of the water soluble resin. The resulting refractory molding composition is thereafter formed into a shaped refractory article. The shaped refractory article is then heated at a temperature up to about 550F. whereby the thermosetting polymer, pitch, and water soluble resin combine to form a bonded refractory article. The resultant refractory article will have a modulus of rupture after coking in excess of 500 psi and a porosity of less than 15%.

DESCRIPTION OF THE PREFERRED EMBODIMENTS

The preferred embodiments of the binder system of the present invention may be employed to prepare shaped refractory articles useful as lininings in basic oxygen process steel making converters. As previously mentioned, it is important that such shaped articles have sufficient strength to support the charge of molten metal in the vessel and have low porosity to limit erosion of the surface lining by the molten metal and slag. It is additionally important that the green or uncoked refractory articles have sufficient strength and resistance to crushing so that they may be transported, handled, and placed in furnaces without breaking or spalling. The technique of the present invention yields refractory brick having all of these properties.

The binder composition of the present invention contains from 10 to 40% by weight, and preferably from 20 to 30% by weight, pitch. The pitch employed is preferably a hard powdered pitch having a softening point of at least 250F. (more preferably at least 300F), and a Conradson coking value of between 50 and 80% by weight. A specific coal tar pitch which is suitable has a softening point of 300–320F., a Conradson coking value of at least 55% by weight, a maximum of 1% by weight distillate up to 300C. and a maximum of 5% by weight distillate up to 355C., a specific gravity of 1.30 minimum, and a benzoyl insoluble content of 30–40% by weight. The pitch is preferably employed in a finely divided form to provide good dispersion throughout the refractory mass. Typically, the pitch is employed in particle sizes such that at least 50% passes through a 200 mesh Tyler standard screen.

The binder composition of the present invention also comprises 25 to 80% by weight, and preferably 40 to 60% by weight, of an aqueous solution of a water soluble resin. The aqueous solution contains from 40 to 60% by weight, and preferably from 45 to 55% by weight, of the water soluble resin. The expression "aqueous solution of a water soluble resin" as used herein includes both true solutions and colloidal solution or dispersion. The water soluble resins are preferably thermosetting.

The preferred water soluble resins are lignosulfonates. Lignosulfonates are ammonium and metallic sulfonate salts made from the lignin of sulfite pulp mill liquors. Such compounds are readily available commercially. An acceptable lignosulfonate is marketed under the trade name Glutrin by American Can Company. Glutrin comprises a 50% solution of calcium-magnesium lignosulfonate. Other suitable lignosulfonates or lignin extracts are marketed under the trade names: Lignosite, Bindarene and Additive A. If preferred, the lignosulfonates can be used in powder form and water added.

A-stage liquid urea-formaldehyde resins form another type of suitable water soluble resin. A suitable urea-formaldehyde resin is available under the trade name Casco Resin CR–5H (The Borden Chemical Company).

The binder composition of the present invention further includes from 10 to 35% by weight, and preferably from 10 to 20% by weight, of water insoluble thermosetting polymer, such as an oil modified alkyd resin. The organic solvent contains from 60 to 100% by weight and preferably from 65 to 75% by weight, of the thermosetting polymer. The expression "thermosetting polymer" as used herein encompasses thermosetting polymers per se and precursors thereof, i.e., compounds which will polymerize to thermosetting polymers.

The preferred thermosetting materials are alkyd resins. The alkyd resins useful in the present invention are sometimes referred to as oil modified alkyds. Alkyd resins are produced by polymerizing a polyhydric alcohol, polybasic acid, and monobasic fatty acids. The fatty acid content of the alkyd is commonly supplied in the form of a triglyceride or oil.

Polybasic acids commonly employed to prepare alkyds include phthalic anhydride, isophthalic acid, maleic anhydride, fumaric acid, azelaic acid, succinic acid, adipic acid and sebacic acid. Common polyhydric acids include glycerol, pentaerythritol, dipentaerythritol, trimethylolethane 2-(hydromethyl)-2-methyl-1, 3-propanediol, sorbitol, ethylene glycol, propylene glycol, dipropylene glycol, trimethyolpropane, 2-ethyl-2-(hydroxymethyl)-1, 3-propanediol, neopentylene glycol, (2,2-dimethyl-1, 3-propanediol), etc. The most commonly employed polyhydric alcohols are pentaerythritol and glycerol while the most commonly employed acid is phthalic anhydride.

The most commonly employed oils include linseed, soya, tall, dehydrated castor, fish, safflower, oticica, cottonseed, and coconut. Soya and linseed oils are preferred with respect to the alkyds useful in the present invention.

Alkyd resins are generally employed as solutions in organic solvents. The most common solvent is mineral spirits, although other hydrocarbons, including aromatic hydrocarbons such as xylene, may also be employed.

The alkyds of the present invention are preferably long oil alkyds and contain an oil content of greater than 60% by weight and a phthalic anhydride content of from 16 to 20%. Odorless mineral spirits are used as a solvent and may be added up to 40% depending upon the particular alkyd used and the viscosity desired.

A specific alkyd resin which has been found to be suitable in the present invention is available under the trade name Aroplaz 1271-M-70 (Ashland Oil Company). This alkyd when diluted with 30% odorless mineral spirits has a viscosity of about 40 cps at 25C. Aroplaz 1271 is a long oil, linseed alkyd containing 77% linseed oil and 16% phthalic anhydride.

A wide variety of organic solvents may be employed with the thermosetting materials. The exact nature of the organic solvent employed will depend to some extent upon the particular thermosetting material used. For example, when alkyd resins are employed, mineral spirits are preferred. The solvent employed should be a solvent for both the pitch and the resin.

A refractory molding composition suitable for use in making shaped refractory articles can be obtained by including from 92 to 97% by weight of a particulate refractory material with from 3 to 8% by weight of the binder composition of the present invention. A preferred molding composition comprises from 94 to 96% by weight of particulate refractory material and from 4.0 to 6.0% by weight of the binder composition. Such compositions may readily be formed into shaped refractory articles which possess good green strength after drying and a high strength and low porosity after coking.

Several conventional refractory materials are suitable, including dead burned magnesite, periclase, sintered alumina aggregates, calcined bauxite, fused magnesite-chrome grains, silica clays and the like. Dead burned magnesite is preferred for basic oxygen furnace applications.

In refractory compositions, well known, commonly used grain sizes of refractory material may be employed. However, to obtain low porosity refractory articles useful in basic oxygen process furnaces, the sizes of the refractory aggregates should be selected to achieve maximum bulk density and low porosity. Techniques of selecting grain size to accomplish this end, by employing combinations of relatively coarse and relatively fine refractory aggregates, are well known in the art. As an example, 60 to 80 parts by weight of a coarse refractory aggregate having a particle size between 4 mesh and 28 mesh Tyler standard screen may be used in combination with 20 to 40 parts by weight of a fine refractory aggregate having a particle size of less than 48 mesh Tyler standard screen. A typical screen analysis suitable to achieve high bulk density and low porosity, using Tyler standard screen sizes, is as follows:

35% passing 4 mesh and retained on 8 mesh
35% passing 8 mesh and retained on 28 mesh
30% ball mill fines (70% passing 325 mesh)

The refractory compositions of the present invention may also contain from 1.0 to 4.0% by weight carbon black. Preferably, a medium thermal grade carbon black is added to the refractory composition to increase residual carbon content after coking.

The preferred method of preparing shaped refractory articles in accordance with the present invention involves first coating from 60 to 80 parts by weight, and preferably 65 to 75 parts by weight, of a coarse refractory aggregate with 1 to 3 parts by weight and preferably 1.0 to 2.0 parts by weight of an organic solvent solution of a thermosetting polymer. The organic solvent solution of a thermosetting polymer should contain 60 to 100% by weight of the thermosetting polymer. The coarse refractory aggregate may have a particle size between 4 mesh and 48 mesh, and preferably between 4 mesh and 28 mesh, Tyler standard screen. The resultant coated coarse refractory aggregate is admixed with 1 to 5 parts by weight and preferably 2 to 4 parts by weight powdered pitch. The resultant coated refractory aggregate-pitch mixture is blended with from 20 to 40 parts by weight, and preferably 25 to 35 parts by weight, of a fine refractory aggregate having a particle size of less than 48 mesh and preferably 70% less than 325 mesh Tyler standard screen, and 1 to 3 parts by weight, and preferably 1 to 2 parts by weight, of an aqueous solution of a water soluble resin. The aqueous resin solution may contain 40 to 60% by weight of the resin. The resultant refractory molding composition is thereafter formed into shaped refractory articles which are heated to from 200F. to 1000F and preferably to about 250–600F. under conditions whereby the thermosetting material, the pitch, and the water soluble binder react to form a bonded refractory article. The resultant bonded refractory article after coking at 1800F for 5 hours will have a modulus of rupture after coking in excess of 500 psi and a porosity of less than 15%.

The following examples demonstrate preferred embodiments of the invention. The examples are for purposes of illustration only, and should not be construed as limiting the invention. In the examples which follow the term "percent" or "%" refers to percent by weight unless otherwise specified and the term "mesh" refers to Tyler standard screen size.

EXAMPLES 1–7

In the refractory mixes of these Examples, dead burned magnesite is used as a refractory material. The following is typical of the grain sizing:
35% passing 4 mesh and retained on 8 mesh
35% passing 8 mesh and retained on 28 mesh
30% ball mill fines Medium thermal grade carbon black was added to all compositions to increase residual carbon content after coking. The aqueous solution of lignosulfonate binder employed was that marketed under the trade name "Glutrin" (American Can Company) and the alkyd resin employed was that marketed under the trade designation "Aroplaz" (Ashland Oil Company).

Refractory shapes were prepared by first coating the coarse refractory aggregate (greater than 28 mesh) with the resin solution, followed by admixing with the pitch. The fines and lignosulfonate (in the examples which include lignosulfonate) were added and the resultant composition was pressed into bricks at room temperature. The bricks were dried either in a regular brick drier at 270–300F. or in a high temperature drier at 550–560F. The compositions employed and the results obtained are summarized in Table 1. The compositions specified in the Table reflect the additives to dead burned magnesite; the remainder of the composition in each instance is dead burned magnesite. The abbreviation "N.D." employed in the Table stands for "not determined".

In Example 1, the alkyd resin alone is used as a binder. Acceptable densities are achieved during pressing, but the bricks crack and bloat badly during drying. The strength of the bricks after coking, (as determined by ASTM Procedure C-607) is very low.

In Example 2, reduced amount of the alkyd resin is used in an attempt to overcome the bloating during drying. However, the brick still cracks during drying.

In Example 3, the alkyd resin was used as a binder but no high melting point pitch was employed. Carbon black was used as a coke contributing ingredient. After drying, the bricks were sound and strong, but after coking, the strength was low.

TABLE 1

| Composition (%) | Ex. No. | 1 | 2 | 3 | 4 | 5 | 6 |
|---|---|---|---|---|---|---|---|
| Pitch (150C. m.p.) | | 2.0 | 2.0 | — | 2.0 | 2.0 | 2.0 |
| Alkyd Resin[1] | | 3.0 | 2.25 | 3.25 | 2.25 | 1.5 | 1.75 |
| Lignosulfonate[2] | | — | — | — | 0.75 | 1.5 | 1.25 |
| Carbon Black | | 2.0 | 2.0 | 2.0 | 2.0 | 2.0 | 2.0 |
| Condition After Drying | | | | | | | |
| At 300F. | | N.D. | Cracked | Sound & Strong | Sound & Strong | Sound & Strong | Sound & Strong |
| At 560F. | | Cracked & Bloated | Cracked | Sound & Strong | Sound & Strong | Sound & Strong | Sound & Strong |
| Strength After Coking (psi) | | | | | | | |
| On Brick Dried at 300F. | | N.D. | N.D. | 220 | 561 | 831 | 722 |
| On Brick Dried at 560F. | | 280 | N.D. | 215 | 455 | 914 | 565 |
| Porosity After Coking (% By Volume) | | | | | | | |
| Brick Dried at 300F. | | N.D. | N.D. | 11.1 | 13.8 | 13.8 | 12.5 |
| Brick Dried at 560F. | | 15.7 | N.D. | 11.5 | 13.9 | 13.3 | 11.3 |

1. Employed in the form of a 70% solution in mineral spirits
2. Employed in the form of a 50% aqueous solution In Example 4, substantially the same mix is employed as Example 2, but with the addition of 0.75% lignosulfonate. This small amount of lignosulfonate in combination with the alkyd resin completely eliminated the bloating and cracking problem during drying. The bricks were sound and very strong after drying at both 300F. and 560F. Surprisingly, it was also found that the strength after coking was greatly increased. A strength was obtained which was nearly twice that obtained when the alkyd resin was used alone.

Examples 5 and 6 incorporate different ratios of alkyd resin to lignosulfonate. In Example 5, a strength is achieved which is over 3 times that obtained when only the alkyd resin was used.

In additional Examples, a mix was made using pitch in combination with only lignosulfonate. This mix had extremely low density after pressing. The lignosulfonate did not dissolve the powdered pitch.

EXAMPLE 7

Using the same grain sizing as employed in Examples 1–6, a mix was prepared using 3% pitch, 2% lignosulfonate, and 1.75% mineral spirits (no alkyd resin). The brick pressed satisfactorily to a good density, but cracked badly after drying. This Example demonstrates that thermosetting polymers must be present in order to produce satisfactory sound and strong bricks after drying.

What is claimed is:

1. A refractory molding composition comprising:
   a. 92 to 97% by weight of a particulate refractory material; and
   b. 3 to 8% by weight of a binder composition comprising
      1. 10 to 40% by weight pitch;
      2. 25 to 80% by weight of an aqueous solution containing from 40% to 60% by weight of ammonium or metal lignosulfonate or phenolaldehyde resin;
      3. 10 to 35% by weight of an organic solvent solution containing from 60% to 100% of an alkyd resin.

2. The refractory molding composition of claim 1 which comprises 94 to 96% by weight of said particulate refractory material.

3. The refractory molding composition of claim 1 in which said particulate refractory material is high purity periclase.

4. The refractory molding composition of claim 1 which also contains from 1 to 4% by weight carbon black.

5. A shaped refractory article of the refractory composition of claim 1.

6. A refractory molding composition comprising:
   a. 92 to 97% by weight of a particulate refractory material;
   b. 3 to 8% by weight of a binder composition comprising
      1. 10% to 40% by weight pitch;
      2. 25% to 80% by weight of an aqueous solution of lignosulfonate, said solution containing from 40 to 60% of said lignosulfonate; and
      3. 10 to 35% by weight of an organic solvent solution of alkyd resin, said solution containing from 70% to 100% of said alkyd.

7. The refractory molding composition of claim 6 in which said alkyd resin is a fatty oil modified alkyd resin.

8. A process for preparing shaped refractory articles comprising:
   a. coating 60 to 80 parts by weight of a coarse refractory aggregate having a particle size between 4 mesh and 28 mesh Tyler standard screen with 1.0 to 3.0 parts by weight of an organic solvent solution of a thermosetting polymer containing 70 to 100% by weight of said thermosetting polymer, to obtain a coated coarse refractory aggregate;
   b. admixing 1 to 5 parts by weight powdered pitch with said coated coarse refractory aggregate to obtain a coated coarse refractory aggregate-pitch admixture;
   c. blending 20 to 40 parts by weight of a fine refractory aggregate having a particle size of less than 48 mesh Tyler standard screen, and 1 to 3 parts by weight of an aqueous solution of a water soluble resin containing 40 to 60% by weight of said water soluble resin with said coated coarse refractory aggregate-pitch admixture to obtain a refractory molding composition; and
   d. thereafter forming said refractory molding composition into shaped refractory articles.

* * * * *

UNITED STATES PATENT OFFICE
CERTIFICATE OF CORRECTION

Patent No. 3,903,025                    Dated September 2, 1975

Inventor(s) GRANT M. FARRINGTON ET AL

It is certified that error appears in the above-identified patent and that said Letters Patent are hereby corrected as shown below:

Claim 1, column 9, line 14, please delete "phenolaldehyde" and insert therefor --urea-formaldehyde--.

Signed and Sealed this

Twenty-fifth Day of January 1977

[SEAL]

Attest:

RUTH C. MASON
Attesting Officer

C. MARSHALL DANN
Commissioner of Patents and Trademarks